(12) United States Patent
Fan et al.

(10) Patent No.: US 7,738,878 B2
(45) Date of Patent: Jun. 15, 2010

(54) METHOD FOR OBTAINING LOCATION INFORMATION OF A MOBILE UNIT USING A WIRELINE TELEPHONE NUMBER

(75) Inventors: Rodric C. Fan, Fremont, CA (US); Carey B. Fan, Fremont, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 2188 days.

(21) Appl. No.: 09/737,294

(22) Filed: Dec. 13, 2000

(65) Prior Publication Data

US 2002/0072377 A1 Jun. 13, 2002

(51) Int. Cl.
*H04W 4/00* (2009.01)
(52) U.S. Cl. ..................................... 455/456.1
(58) Field of Classification Search ................. 455/403, 455/404, 404.1, 404.2, 410, 411, 412, 414.1, 455/415, 417, 422.1, 435, 435.1, 445, 456.1, 455/456.2–456.4, 456.6, 457, 461, 517, 521, 455/566, 12.1; 342/450, 457, 357.03, 357.09, 342/357.1, 357.13, 357.06, 357.17, 357.01; 701/24, 35–36, 202, 209, 211, 201, 200, 701/207, 208, 213, 300; 709/217, 219; 340/988–989, 340/439; 379/204.1, 212.01, 157, 164, 165, 379/200, 210, 211, 156, 258, 88.19, 142.06, 379/93.23, 88.2, 88.21, 42.02, 142.17, 141.05
See application file for complete search history.

(56) References Cited

U.S. PATENT DOCUMENTS 5,375,161 A * 12/1994 Fuller et al. .................. 455/417
6,466,796 B1 * 10/2002 Jacobson et al. ........... 455/456.3
6,539,080 B1 * 3/2003 Bruce et al. ............... 379/88.17
6,687,360 B2 * 2/2004 Kung et al. ............ 379/211.02
6,748,054 B1 * 6/2004 Gross et al. .............. 379/88.12
6,760,585 B1 * 7/2004 Stumer et al. ............ 455/435.1
6,766,361 B1 7/2004 Venigalla
2002/0024947 A1 * 2/2002 Luzzatti et al. .............. 370/352
2002/0042266 A1 * 4/2002 Heyward et al. ............ 455/414
2002/0045456 A1 * 4/2002 Obradovich ................ 455/457
2003/0104822 A1 * 6/2003 Bentley ..................... 455/456
2003/0147518 A1 * 8/2003 Albal et al. ............ 379/207.15
2005/0018822 A1 * 1/2005 Bruce et al. .............. 379/88.18

FOREIGN PATENT DOCUMENTS

WO WO 2003/060712 7/2003
WO WO 2004/114144 12/2004

* cited by examiner

*Primary Examiner*—Melody Mehrpour

(57) ABSTRACT

A position determination method in a mobile unit uses the telephone number of a wireline telephone and a reverse phone-book operation for determining the location of a mobile unit. In one embodiment, a method for determining the location of a mobile unit using a telephone number of a wireline telephone in the vicinity of the mobile unit includes receiving at a server the telephone number transmitted from the mobile unit using wireless communication through a data network, retrieving an address associated with the telephone number in the server, and retrieving a location of the mobile unit based on the address. The server may provide location-relevant information using the location information. The system and method of the present invention provides a low cost solution to position determination in wireless hand-held devices and can be used to supplement the conventional positioning systems.

37 Claims, 2 Drawing Sheets

METHOD FOR OBTAINING LOCATION INFORMATION OF A MOBILE UNIT USING A WIRELINE TELEPHONE NUMBER

BACKGROUND OF THE INVENTION

1. Field of the Invention

The present invention relates to a system and a method for position determination, and more particularly to a system and a method for determining the location of a roving mobile unit and providing location relevant information to the mobile unit.

2. Description of the Related Art

In recent years, commercial applications based on positioning systems have been developed. Location-relevant services, which provide information or perform services based on the geographical location of a mobile client, are examples of such positioning system applications. A location-relevant service can be used to provide travel-related services (e.g., driving directions) based on the position of the mobile client. One example of a location-relevant service is described, for example, in copending and commonly assigned U.S. patent application Ser. No. 09/422,116, entitled "Method for Distribution of Locality-Relevant Information using a Network" of Rodric C. Fan, filed Oct. 20, 1999 ("the '116 application"). To provide an example regarding the architecture and application of a location-relevant information system, the disclosure of the '116 application is incorporated herein by reference in its entirety.

Typically, a location-relevant system includes a location-relevant service server accessible by multiple mobile units over a communication system, which includes wireless links to the mobile units. The mobile units provide their positions based on a positioning system. The position of a mobile unit can be provided, for example, by the Global Positioning System (GPS) or, in a cellular telephone network, by a process called triangulation which is based on signal delays from system base stations of known fixed locations. Due to technology limitations at the present time, it is costly to integrate the capabilities of both positioning and wireless communication of such a mobile unit into a hand-held device, such as a mobile telephone or a personal digital assistant (PDA).

Even if a hand-held device is equipped with a positioning system, inherent shortcomings of existing positioning system technology limit the hand-held device's ability to determine its position solely based on the positioning system. Often, there are geographical areas in which the positioning system does not function, such as when the positioning system is not able to acquire the necessary positioning signals. For example, when GPS is used for position determination, a GPS receiver must be able to observe four or more GPS satellites in orbit around the earth and acquire information from the GPS satellites. Because a GPS receiver requires an unobstructed view of the GPS satellites, the GPS receiver typically does not work well indoors where the satellite signals may be obstructed or weak, or in urban areas where buildings often obstruct the view of the GPS satellites. On the other hand, when position determination using triangulation in a cellular telephone network is used, the hand-held device must be able to obtain signals from three surrounding base stations. Thus, such a positioning system relies on the availability of cellular base stations in the area and typically has limited service range.

Nonetheless, there is a great demand in incorporating position determination capability in a wireless mobile unit, particularly in a hand-held device, to enable a user of the mobile unit to conveniently obtain location-relevant information. Furthermore, recent Federal Communications Commission (FCC) mandate for enhanced 911 emergency services (E911) requires a wireless telephone to be capable of providing location information for 911 calls. Thus, position determination in wireless telephones is becoming a necessity in order to meet the requirements of the E911 service.

A position determination method using the United States zip code has been described. To determine a user's current location, the user of a mobile unit keys in the 5-digit United States zip code of the area the user is currently located. The location-relevant service uses the zip code to determine the current location of the mobile unit. This method has several shortcomings. First, the position determination is not accurate because the method only determines in which geographical area covered by that zip code the mobile unit is located. The geographical area covered by a zip code can be very large. Thus, the zip code based position determination can only provide a gross estimate of the mobile unit's location. Second, the zip code based position determination method requires the user of a mobile unit to know the zip code of her current location. However, when the user is lost or traveling in an unfamiliar area, it is not likely that the user would know the zip code of her current location. Therefore, the zip code based position determination method is not practical in operation.

Therefore, it is desirable to provide means for obtaining location information of mobile units, particularly in areas where the existing positioning systems cannot provide adequate service.

SUMMARY OF THE INVENTION

According to one embodiment of the present invention, a method for determining the location of a mobile unit using a telephone number of a wireline telephone in the vicinity of the mobile unit includes receiving at a server the telephone number transmitted from the mobile unit using wireless communication through a data network, retrieving an address associated with the telephone number in the server, and retrieving a location of the mobile unit based on the address. The method may further include obtaining at the server location-relevant information using the location information.

According to another embodiment of the present invention, a method for providing location-relevant information over a data network to a mobile unit includes receiving at the server a first telephone number associated with a wireline telephone, the first telephone number being transmitted from the mobile unit using wireless communication through the data network, retrieving a first address associated with the first telephone number in the server, and retrieving a first location based on the first address. The first location can be the current location of the mobile unit or it can be a destination location of interest. In another embodiment, the method further includes receiving at the server a second telephone number of a wireline telephone in the vicinity of the mobile unit, the second telephone number being transmitted from the mobile unit using wireless communication through a data network, retrieving a second address associated with the second telephone number in the server, and retrieving a second location of the mobile unit based on the second address.

In one embodiment, the method further includes providing location-relevant information to the mobile unit based on the first location and the second location. For example, the location-relevant information may be driving direction from the second location to the first location.

The present invention is better understood upon consideration of the detailed description below and the accompanying drawings.

DETAILED DESCRIPTION OF THE PREFERRED EMBODIMENTS

In accordance with the present invention, a position determination method in a mobile unit determines the location of a mobile unit based on the telephone number of a wireline (or wired) telephone and a reverse phone-book operation. A mobile unit, using the method of the present invention, can determine its location even when the mobile unit is not equipped with a positioning system or when the positioning system in the mobile unit is currently not functioning, such as when the mobile unit cannot receive GPS satellite signals or cannot receive signals from three cellular base stations to perform triangulation. The position determination system and method of the present invention provides a low cost solution to position determination for wireless mobile devices and can be used to supplement the deficiencies of the conventional position determination methods and systems.

Figure 1:
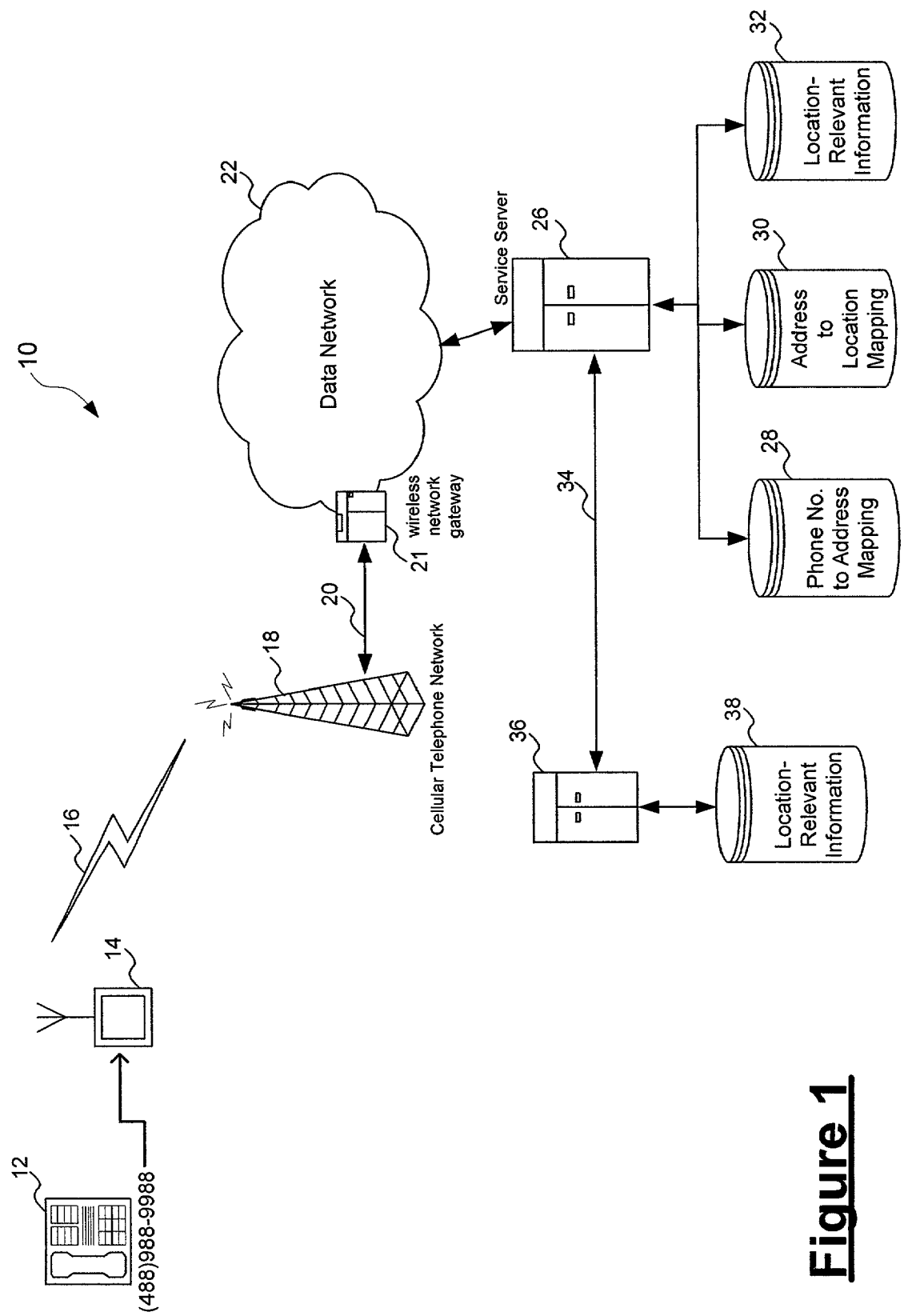
FIG. 1 illustrates a positioning service system according to one embodiment of the present invention.

The method of the present invention relies on the telephone number of a stationary wireline telephone (also called wired telephone) for position determination. FIG. 1 illustrates a positioning service system 10 in which the present invention can be practiced. Referring to FIG. 1, positioning service system 10 includes a mobile unit 14 having access to a service server 26 through a data network 22 using wireless communications. In FIG. 1, positioning service system 10 is shown with only one mobile unit 14. This is illustrative only and in actual practice, system 10 is capable of supporting multiple number of mobile units requiring position determination service. Mobile unit 14 can be installed in a vehicle or it can be a hand-held device, such as a cellular telephone or a personal digital assistant. Mobile unit 14 may include a positioning system receiver for determining its position using, for example, a GPS system or a terrestrial triangulation-based system. When mobile unit 14 is equipped with a positioning system receiver, the method of the present invention supplements the position determination capability of such a positioning system.

Mobile unit 14 is a wireless communication device and communicates in a conventional manner with service server 26 via wireless communication link 16 using, for example, CDPD, GSM, CDMA or other conventional wireless or cellular telephone communication link. Wireless communication link 16 connects mobile unit 14 with a wireless communication system including a cellular telephone network 18 and a wireless network gateway 21. Wireless network gateway 21 is coupled to data network 22 and provides protocol conversion for data traffic between cellular telephone network 18 and data network 22. Data network 22 is typically a wide area data network, such as the publicly accessible Internet.

Service server 26 provides positioning service to mobile units within positioning service system 10. In other embodiments, service server 26 also distributes location-relevant information to mobile units in system 10 over data network 22. When data network 22 uses TCP/IP communication protocols (as in the case of the Internet), service server 26 can have a hypertext "web" interface and provides positioning information or location-relevant information. In the present embodiment, server 26 is coupled to databases 28, 30 and 32. Database 28 contains the information for mapping a telephone number to an address associated with the telephone number. In the present description, this operation is referred to as the "reverse phone-book" operation. In the present description, the term "address" is used to refer to the identification of a geographical location using information such as the street name, street number, the city, and the state. In one embodiment, the address has the same format as that generally included in the local telephone books. Database 30 contains the information for mapping an address to a location associated with the address. In the present description, the term "location" and "position" are used interchangeably to refer to the position coordinate, i.e. longitude and latitude, of an object. The translation from an address to the position coordinate of the address can be performed using any conventional methods. In the present embodiment, the translation from an address to a position coordinate is performed using Geo-Coding which is well known in the art.

When service server 26 is disposed to provide location-relevant services in addition to positioning determination services, service server 26 is coupled to database 32 containing location-relevant information. Location-relevant information can include driving directions, local gas stations, local restaurants and other local points of interest for each associated location. In other embodiments, service server 26 may obtain location-relevant information provided by other location-relevant service providers. For example, in FIG. 1, service server 26 is in communication with a location-relevant service server 36 via data link 34. Location-relevant service server 36 is typically coupled to a database 38 containing location-relevant information. Location-relevant service server 36 may provide, for example, Mobile Yellow Page services, travel information, or restaurant reviews. Server 36 may be coupled to the same data network 22 and data link 34 may be a data link over data network 22.

To obtain positioning or location-relevant information from service server 26, a user of mobile unit 14 keys into the mobile unit the telephone number of a wireline or wired telephone, such as telephone 12 of FIG. 1. The wireline telephone can be in the near vicinity of the user or it can be a telephone at a destination location of interest to the user. For instance, when the user is interested in determining her current location, all the user needs to do is to find a nearby wireline telephone such as a pay phone or a telephone number of a nearby business. The user keys into the mobile unit the telephone number of such a wireline telephone to obtain the position information from service server 26. Of course, the user may also keys in a telephone number of a wireline telephone located at a destination point of interest to obtain positioning and location-relevant information for the destination location. Furthermore, a user travelling from her current location to a destination location may enter the telephone numbers of wireline telephones at the source and destination locations to obtain driving directions from service server 26. The operation of positioning service system 10 to provide positioning and location-relevant information to a mobile unit will be described below with reference to FIG. 2.

Figure 2:
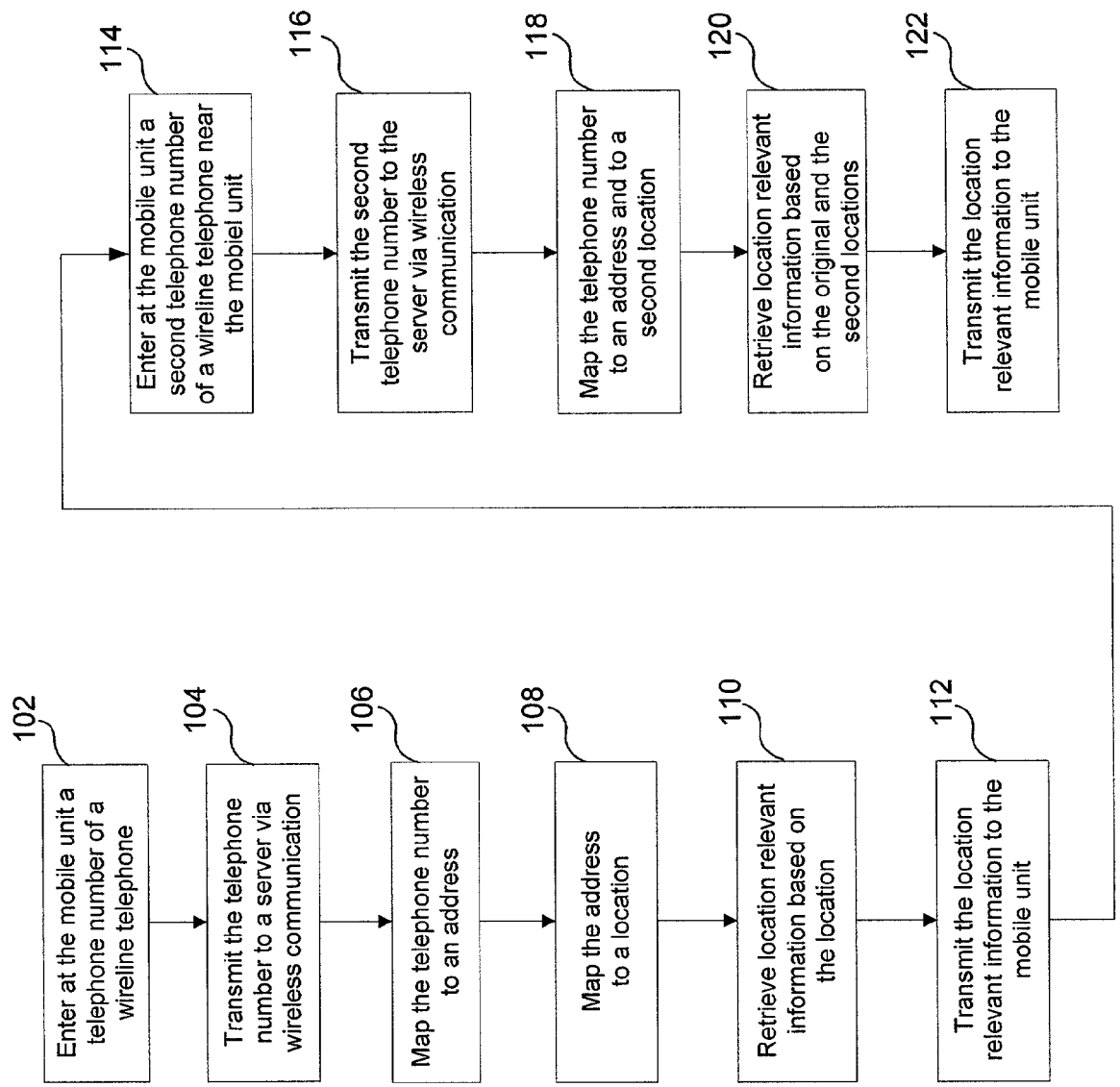
FIG. 2 is a flow chart illustrating the position determination method according to one embodiment of the present invention.

FIG. 2 is a flow chart illustrating a position determination method according to one embodiment of the present invention. At step 102, the user of mobile unit 14 enters into the mobile unit the telephone number (e.g., (488)988-9988 for a United States telephone number) of a wireline telephone 12. Mobile unit 14 may provide a conventional user interface console for receiving data input. At step 104, the telephone number ((488)988-9988) is transmitted via wireless communication link 16 over data network 22 to service server 26. As described above, wireless communication link 16 connects mobile unit 14 to cellular telephone network 18 and network gateway 21 which is coupled to data network 22. At step 106, upon receipt of the telephone number transmitted by mobile unit 14 over data network 22, service server 26 performs a "reverse phone-book" operation for mapping the telephone number to an address associated with the telephone number. Service server 26 uses information stored in database 28 for the "reverse phone-book" operation. Then, at step 108, service server 26 maps the address obtained previously to a location (or position coordinate) associated with the address. The address-to-location mapping information is contained in database 30 and the mapping is performed using Geo-Coding. After determining the location associated with the telephone number transmitted by the mobile unit, service server 26 may return the location information to mobile unit 14 over data network 22 and wireless communication link 16. If wireline telephone 12 is nearby the user, the user of mobile unit 14 can then determine her current location. If wireline telephone 12 is at a destination location of interest, the user of mobile unit 14 may then determine the destination location based on the destination telephone number.

In the present embodiment, besides providing positioning information, positioning service system 10 also provides location-relevant information. Thus, at step 110, service server 26 retrieves location-relevant information from database 32 based on the location information determined previously in step 108. In other embodiments, service server 26 may obtain location-relevant information from server 36 as described above. At step 112, service server 26 transmit the location-relevant information to mobile unit 14.

FIG. 2 illustrates one embodiment of the present invention where the user enters a first telephone number of a destination location and a second telephone number of a current location for obtaining positioning and location-relevant information based on the two telephone numbers. Thus, assuming that the telephone number entered at step 102 is a telephone number of a destination wireline telephone, step 108 provides the destination location associated with that telephone number. At step 114, the user enters at mobile unit 14 a second telephone number of a wireline telephone near the mobile unit. At step 116, the second telephone number is transmitted to service server 26 over data network 22. At step 118, service server 26 performs "reverse phone-book" operation to map the second telephone number to a second address and then map the second address to a second location, which is the source location in this embodiment. Then, at step 120, if location-relevant information is desired, service server 26 proceeds to retrieve the location-relevant information based on the first location (determined in step 108) and the second location. In one embodiment, the location-relevant information is the driving direction from the second location (the source location) to the first location (the destination location). At step 122, the location-relevant information is transmitted to mobile unit 14 via data network 22.

The process steps of FIG. 2 illustrate one embodiment of the position determination method of the present invention only and is not intended to be limiting. For example, the process of FIG. 2 is used to illustrate the situation where a user of mobile unit 14 wishes to obtain position and location-relevant information for her current location and a destination location. In other embodiments, only a portion of the process steps needs to be performed to obtain the location information or location-relevant information using one telephone number of one wireline telephone. The wireline telephone may be near mobile unit 14 or it may be a wireline telephone at a destination location as described above. Furthermore, while the flow chart of FIG. 2 illustrates a process sequence for entering two telephone numbers and obtaining positioning and location-relevant information, a person of ordinary skill in the art would appreciate that the process sequence may be altered to achieve the same results. For example, the user of mobile unit 14 may enter the first and second telephone numbers at the same time and the two telephone numbers may be transmitted to service server 26 concurrently.

The position determination method of the present invention provides a mobile unit without a positioning system the capability of location determination. This capability is particularly important in light of the E911 service mandate from the FCC where mobile telephones are required to be able to provide location information for 911 calls. Thus, in one embodiment of the present invention, the location determined using the method of the present invention is forwarded to a 911 service center for providing emergency service to the mobile unit.

Furthermore, even if a mobile unit includes a positioning system, such as GPS or triangulation based on a cellular network, the position determination method of the present invention can supplement the operation of the positioning system in areas where the conventional positioning systems are not able to provide positioning services. Since wireline telephones, such as pay phones, are widely available and widely distributed, a user of a mobile unit can easily obtain the telephone number of a wireline telephone for location determination. This represents a marked improvement over the conventional process where the user needs to know the zip code of her current location which zip code information is difficult to obtain, particularly when the user is lost.

In other embodiments, the positioning service system and position determination method of the present invention can be incorporated in other positioning systems and location-relevant service systems to enhance the services provided by those location-relevant service systems. For example, a position-based system for distributing travel information over a data network is described in U.S. Pat. No. 5,959,577, entitled "Method and Structure for Distribution of Travel Information Using Network," to Fan et al. which is assigned to @Road, Inc., the assignee of the present invention. A location-relevant service is described in aforementioned copending and commonly assigned '116 application of Rodric C. Fan. A position-based system delivering services over the internet is disclosed in copending and commonly assigned U.S. patent application Ser. No. 09/521,247, entitled "Method and Structure for Distribution of Travel Information Using a Network," to Fan et al. A method for facilitating a commercial transaction based on a current location of a mobile customer is disclosed in copending and commonly assigned U.S. patent application Ser. No. 09/697,690, entitled "System And Method For Providing Mobile Location-Relevant Commerce," of Sandhu et al. A method for providing access to a location-relevant service form a mobile communication device based on the position of another mobile unit is disclosed in copending and commonly assigned U.S. patent application Ser. No. 09/599,053, entitled "Dual Platform Location-Relevant service," of Fan et al. The above-mentioned patent and patent applications are incorporated herein by reference in their entireties. The position determination method and positioning service system of the present invention can be incorporated into any of these aforementioned location-relevant service systems to assist in location determination for providing location-relevant services.

The above detailed descriptions are provided to illustrate specific embodiments of the present invention and are not intended to be limiting. Numerous modifications and variations within the scope of the present invention are possible. The present invention is defined by the appended claims.

We claim:

1. A method of determining a location of a mobile unit, said method comprising:
   receiving a telephone number of a wireline telephone through a data network, said wireline telephone being located in a vicinity of said mobile unit, and said telephone number being wirelessly transmitted to said data network by said mobile unit;
   retrieving an address associated with said telephone number; and
   retrieving said location of said mobile unit based on said address.

2. The method of claim 1, further comprising:
   transmitting said location to said mobile unit through said data network.

3. The method of claim 1, further comprising:
   obtaining location-relevant information associated with said location.

4. The method of claim 3, further comprising:
   transmitting said location-relevant information to said mobile unit through said data network.

5. The method of claim 3 further comprising:
   querying a server for said location-relevant information based on said location; and
   receiving said location-relevant information from said server.

6. The method of claim 1, further comprising:
   providing said location to an entity that is providing a service to said mobile unit.

7. The method of claim 6, wherein said-providing said location to an entity that is providing a service to said mobile unit further comprises:
   providing said location to an entity that is providing a service to said mobile unit, said service being an emergency service.

8. The method of claim 1, wherein said receiving said telephone number of said wireline telephone through said data network, said wireline telephone being located in said vicinity of said mobile unit, and said telephone number being wirelessly transmitted to said data network by said mobile unit, further comprises:
   receiving said telephone number of said wireline telephone through said data network, said wireline telephone being located in said vicinity of said mobile unit, and said telephone number being wirelessly transmitted to said data network by said mobile unit, wherein said data network is a publicly shared network.

9. The method of claim 1, wherein said-receiving said telephone number of said wireline telephone through said data network, said wireline telephone being located in said vicinity of said mobile unit, and said telephone number being wirelessly transmitted to said data network by said mobile unit, further comprises:
   receiving said telephone number of said wireline telephone through said data network, said wireline telephone being located in said vicinity of said mobile unit, and said telephone number being wirelessly transmitted to said data network by said mobile unit using a wireless link and a gateway coupled with said data network.

10. The method of claim 1, wherein said-receiving said telephone number of said wireline telephone through said data network, said wireline telephone being located in said vicinity of said mobile unit, and said telephone number being wirelessly transmitted to said data network by said mobile unit, further comprises:
    receiving said telephone number of said wireline telephone through said data network, said wireline telephone being located in said vicinity of said mobile unit, and said telephone number being wirelessly transmitted to said data network by said mobile unit using a cellular telephone network.

11. The method of claim 1, wherein said-receiving said telephone number of said wireline telephone through said data network, said wireline telephone being located in said vicinity of said mobile unit, and said telephone number being wirelessly transmitted to said data network by said mobile unit, further comprises:
    receiving said telephone number of said wireline telephone through said data network, said wireline telephone being located in said vicinity of said mobile unit, and said telephone number being wirelessly transmitted to said data network by said mobile unit using a cellular telephone modem.

12. The method of claim 1, wherein said receiving said telephone number of said wireline telephone through said data network, said wireline telephone being located in said vicinity of said mobile unit, and said telephone number being wirelessly transmitted to said data network by said mobile unit, further comprises:
    receiving said telephone number of said wireline telephone through said data network, said wireline telephone being a pay phone located in said vicinity of said mobile unit, and said telephone number being wirelessly transmitted to said data network by said mobile unit.

13. The method of claim 3, wherein said-utilizing said location to obtain said location-relevant information associated with said location further comprises:
    utilizing said location to obtain said location-relevant information associated with said location, said location-relevant information comprising an address associated with a local point of interest.

14. The method of claim 1, further comprising:
    accessing a first set of information stored in a first database; and
    utilizing said first set of information to map said telephone number to said address.

15. The method of claim 14, further comprising:
    accessing a second set of information stored in a second database; and
    utilizing said second set of information to map said address to said location.

16. The method of claim 15, wherein said utilizing said second set of information to map said address to said location further comprises:
    utilizing said second set of information to map said address to said location, said location being a position coordinate comprising longitude and latitude information.

17. The method of claim 15, wherein said-utilizing said second set of information to map said address to said location further comprises:
    utilizing said second set of information to map said address to said location using Geo-Coding.

18. A method of obtaining location-relevant information being of interest to a mobile unit, said method comprising:
    receiving a first telephone number through a data network, said first telephone number being associated with a first wireline telephone, and said first telephone number being wirelessly transmitted by said mobile unit to said data network;
    retrieving a first address associated with said first telephone number;
    retrieving a first location based on said first address; and accessing said location-relevant information based on said first location.

19. The method of claim 18, wherein said receiving said first telephone number through said data network, said first telephone number being associated with said first wireline telephone, and said first telephone number being wirelessly transmitted by said mobile unit to said data network, further comprises:
receiving said first telephone number through said data network, said first telephone number being associated with said first wireline telephone, and said first telephone number being wirelessly transmitted by said mobile unit to said data network, wherein said first wireline telephone is located near a vicinity of said mobile unit.

20. The method of claim 18, wherein said receiving said first telephone number through said data network, said first telephone number being associated with said first wireline telephone, and said first telephone number being wirelessly transmitted by said mobile unit to said data network, further comprises:
receiving said first telephone number through said data network, said first telephone number being associated with said first wireline telephone, and said first telephone number being wirelessly transmitted by said mobile unit to said data network, wherein said first wireline telephone is located at a destination of interest.

21. The method of claim 18, further comprising:
transmitting said first location to said mobile unit said data network.

22. The method of claim 18, further comprising:
transmitting said location-relevant information to said mobile unit through said data network.

23. The method of claim 22, further comprising:
querying a server for said location-relevant information based on said first location; and
receiving said location-relevant information from said server through said data network.

24. The method of claim 18, wherein said retrieving said first location based on said first address further comprises:
retrieving said first location based on said first address, said location being a position coordinate comprising longitude and latitude information.

25. The method of claim 18, further comprising:
mapping said first address to said first location using Geo-Coding.

26. The method of claim 20, further comprising:
receiving a second telephone number associated with a second wireline telephone located in a vicinity of said mobile unit, said second telephone number being wirelessly transmitted by said mobile through said data network;
retrieving a second address associated with said second telephone number; and
retrieving a second location based on said second address.

27. The method of claim 26, further comprising:
obtaining location-relevant information using said first location and said second location; and
transmitting said location-relevant information to said mobile unit through said data network.

28. The method of claim 27, wherein said-obtaining location-relevant information using said first location and said second location further comprises:
obtaining location-relevant information using said first location and said second location, said location-relevant information comprising driving directions from said second location to said first location.

29. The method of claim 26, wherein said retrieving said second location of said mobile unit based on said second address further comprises:
retrieving said second location of said mobile unit based on said second address, wherein said first location and said second location each comprise a position coordinate comprising longitude and latitude information.

30. The method of claim 26, further comprising:
mapping said first address to said first location; and
mapping said second address to said second location.

31. A system for determining a location of a mobile unit coupled with a data network over a first wireless link, said system comprising:
a server accessible over said data network, said server accessing a database that stores a first set of information for mapping a wireline telephone number to an address and a second set of information for mapping said address to a location, said server receiving a first telephone number through said data network, said first telephone number being associated with a first wireline telephone that is located in a vicinity of said mobile unit, and said server determining a first location based on said first telephone number, wherein said first location is indicative of a location of said mobile unit.

32. The system of claim 31, wherein said first location is a position coordinate comprising longitude and latitude information.

33. The system of claim 31, wherein said second set of information is provided using Geo-Coding.

34. The system of claim 31, wherein said server obtains location-relevant information based on said first location and provides said location-relevant information to said mobile unit.

35. The system of claim 31, wherein said server receives a second telephone number through said data network, said second telephone number being associated with a second wireline telephone and being transmitted by said mobile unit, and wherein said server determines a second location using said first set of information and said second set of information, said second location being indicative of a location of interest of said mobile unit.

36. The system of claim 35, wherein said server provides location-relevant information to said mobile unit based on said first location and said second location.

37. The system of claim 36, wherein said location-relevant information comprises driving directions from said first location to said second location.

* * * * *